United States Patent
Nemeth

[11] Patent Number: 6,044,934
[45] Date of Patent: Apr. 4, 2000

[54] LOCKING DEVICE FOR A LINEAR MOVEMENT UNIT

[75] Inventor: Ferenc Nemeth, Goldach, Switzerland

[73] Assignee: PWB AG, Altstätten, Switzerland

[21] Appl. No.: 08/907,565

[22] Filed: Aug. 8, 1997

[30] Foreign Application Priority Data

Aug. 23, 1996 [CH] Switzerland .............................. 2074/96

[51] Int. Cl.[7] .................................................. B23Q 1/28
[52] U.S. Cl. .................................. 188/67; 92/25; 188/265
[58] Field of Search .............................. 188/67, 41, 265, 188/300; 303/89; 285/902; 248/410, 354.1, 188.5; 403/365, 106, 345; 92/14, 25, 28, 15, 27; 91/41; 297/375; 74/531

[56] References Cited

U.S. PATENT DOCUMENTS 2,806,723   9/1957   Fairclough .
5,184,700   2/1993   Mainardi ................................... 188/67
5,823,300   10/1998  Higuchi ..................................... 188/67

FOREIGN PATENT DOCUMENTS 901271    3/1985   Belgium .
0452702   10/1991  European Pat. Off. .

*Primary Examiner*—Douglas C. Butler
*Attorney, Agent, or Firm*—Martin A. Farber

[57] ABSTRACT

A locking device for a linear movement unit (1) ensures quick and precise locking by providing a guidance when two clamping members (9) pivot into a clamping position substantially free from any play. The guidance is provided by at least first and second guide surfaces (12, 13 or 14, 15) so that the clamping members engage a guide rod (4) simultaneously to lock the unit on it, thus avoiding any spluttering.

21 Claims, 2 Drawing Sheets

LOCKING DEVICE FOR A LINEAR MOVEMENT UNIT

FIELD OF THE INVENTION

This invention relates to a locking device for a linear movement unit supported displaceably along at least one guide rod. The locking device comprises two clamping members having each a clamping opening through which the guide rod passes. The clamping members are pivotal between a first position and a second position. In the first position, they engage frictionally on the guide rod, while in the second position, they are freely displaceable along the guide rod.

BACKGROUND OF THE INVENTION

Linear movement units are used in various technical fields, particularly for robots or manipulators. Such units comprise a linear guiding device including at least one guide rod or guide section as well as a moving unit guided thereby. The moving unit is ordinarily displaced along this guiding device by some drive. In order to lock the moving unit in a desired position, a locking device is provided.

EP-B-452 702 (=U.S. Pat. No. 5,184,700) discloses a locking device of the kind described above, i.e. comprising two clamping members which has each a clamping opening for the guide rod. The clamping members are pivotal into and out of their clamping position by an actuating unit. It has been found that a moving unit in motion cannot sufficiently quickly be locked by the known device to the guide rod. The clamping force achieved is apparently too small so that the moving unit splutters further in small jumps into an undefined position.

SUMMARY OF THE INVENTION

It is an object of the invention to provide a locking device which ensures precise locking in any position desired.

This object is achieved according to the invention by the discovery that quick locking cannot (only) be provided by reasonably increasing the clamping force, but by guiding the pivoting movement of the clamping members substantially free from play. It has been found that spluttering of the known device is enabled by some play during pivoting movement.

In order to provide a more precise pivoting movement and to ensure simultaneous engagement of the guide rod, the clamping members comprise first guiding surfaces which cooperate, according to the invention, with second guiding surfaces, especially of a holding device. At least one guiding surface is curved, when seen in a section transverse to their pivoting axis, so that the guiding surfaces lead to a pivoting movement of the clamping members substantially free from play.

Now, since the first guide surfaces of the clamping members cooperate substantially free from any play in guiding the pivotal movement with second guide surfaces, especially of the holder for the clamping members, the clamping members carry out a pivotal movement about a well defined pivoting axis so that clamping is effected simultaneously and without any spluttering. In doing this, at least one guiding surface that is curved, when seen in a cross-sectional plane transversely to the pivoting axis, is provided for the pivoting movement of each clamping member in such a way that the first and second guiding surfaces assigned to each other ensure a pivoting movement of the clamping members about a well defined pivoting axis.

The orientation and position of the respective pivoting axis depends on the arrangement of the guiding surfaces as well as upon the position of the clamping opening and of the guide rod guided thereby. For guidance free from any play, there is a guiding contact between the first and second guiding surfaces, on the one hand, and a guiding contact between the clamping members themselves, on the other hand. The surfaces of the two clamping members which face each other comprise preferably third guiding surfaces which engage either directly each other or via an intermediate part, in particular a pin being aligned with or parallel to the pivoting axis of the clamping members.

BRIEF DESCRIPTION OF THE DRAWINGS

Further details and advantages will become apparent by the following description of embodiments of the present invention with reference to the accompanying schematical drawings in which.

DETAILED DESCRIPTION OF THE DRAWINGS

Figure 1:
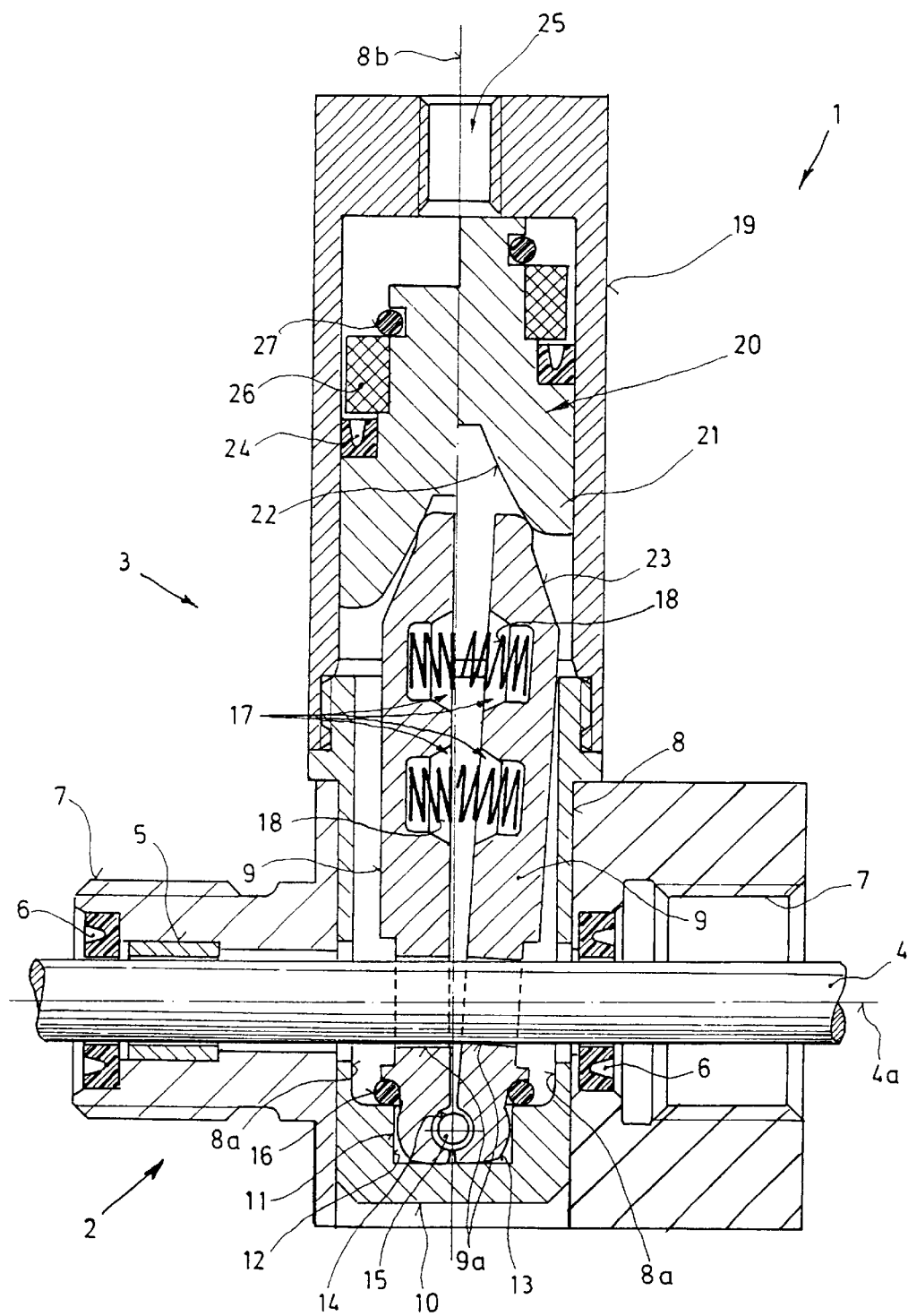
FIG. 1 is a longitudinal section of a locking device guided along a guide rod, the figure representing a pair of clamping members and an actuating plunger element in two different positions.

FIG. 1 shows a guiding device 2 and a locking device 3 of a linear movement unit 1 that is displaceable along a rod 4 or rod axis 4a. The rod 4 extends through at least one sliding bearing 5 and two seals 6 of the guiding device 3 which comprises connection zones 7 on both sides.

The locking device 3 comprises at least one holder to be inserted into the guiding device 2. the holder being particularly formed by a cylindrical casing or sleeve 8 which extends along a sleeve axis 8b and receives and holds two clamping members 9 so that they are pivotal about a pin 15 which serves as a guide surface as is described later. The clamping members are preferably at least in part semi-cylindrical in cross-section. The sleeve 8 comprises a through hole 8a, and the clamping members 9 have aligned clamping holes 9a for receiving the rod 4. The clamping holes 9a are adapted to the cross-section of the rod 4 in such a manner that, in a first position, they frictionally engage the rod 4 and clamp it, while leaving it freely moveable in a second position. The clamping member 9 arranged at the right side of FIG. 1 is represented in said first position. The clamping member 9 arranged at the left side of FIG. 1 is represented in said second position. This movement involves a cross-section of the clamping holes 9a which is somewhat larger than that of the guide rod 4 and, therefore, would allow some mutual play.

The pivoting movement between these two positions is defined both by the supporting arrangement of the two clamping members 9 within the sleeve 8 and by the rod 4 extending through the clamping openings 9a. The sleeve 8 has preferably a foot or closure region 10 at one end which comprises a guiding recess 11. This guiding recess 11 is preferably formed by a cylindrical bore extending along the axis 8b of the sleeve 8 and serves, at least in part, to provide another, particularly second, guide surface 12. A foot and guide end of each of the clamping members 9 is inserted into the guiding recess 11 and comprises a calotte-shaped or partial spherical guide surface 13 that forms, in particular, a first guide surface. The guiding recess 11 could also be made substantially rectangular in cross-section, and accordingly, the guide surfaces 13 would be partially cylindrical, the axes of the cylinders being substantially coincident (or parallel) to the pivoting axis.

Within the region of the foot or guide end of each of the clamping members 9, there are guide surfaces 14 that face each other and form particularly third guide surfaces. In order to arrange the clamping members 9 in side-by-side relationship without any displacement in longitudinal direction, a pin 15 is arranged so as to engage the third guide surfaces 14 and to form another guide surface and, at the same time, a pivot axle by extending in alignment and coincidence with the pivot axis of the two clamping members 9. The foot ends and the pin 15 are dimensioned in such a manner that the fit is substantially free from any play into the guide recess 11. Optionally an elastic ring 16 of elastomeric or rubber material is provided to hold the clamping members 9 together and the guide surface 14, and the pin 15 in engagement with each other. This elastic ring 16 extends preferably around both clamping members 9 in a region between the guide surfaces 13, 14 and the clamping openings 9a, i.e. in the region of the foot ends of the clamping members 9. It should be understood that instead of a pin 15 and the elastic ring 16, a pivoting joint or hinge may be provided between the two clamping members 9 in the region of their foot or guide end. It should also be clear that optionally only one pair of guide surfaces, i.e. the guide surfaces 12, 13 or the guide surface 14, and the pin 15 are used.

In order to press the clamping members 9 into a first or clamping position, at least one pressure exerting device for pressing the clamping members 9 apart is provided. This pressing device comprises recesses 17 in the two clamping members assigned to each other as well as spring elements inserted therein, preferably helicoidal springs 18. By arranging these spring elements 18 farther situated from the pivoting axis and the pin 15 than the clamping openings 9a, a high clamping force can be achieved. Pivoting movement to outside is delimited by the sleeve 8.

An actuating cylinder 19 joins to the open end of the sleeve 8 opposite the foot end, and has an actuating member for pressing the clamping means together against the force of the springs 18. The connection between the sleeve 8 and the actuating cylinder 19 is preferably a threaded connection, but may optionally be a snapping plug connection. The actuating member is preferably a piston element 20 which pivots and actuates the clamping members 9 by means of at least one, preferably two, cams or actuating projections 21 when moving towards the free head ends of the clamping members 9. In the embodiment shown, the actuating projections 21 have each a first actuating or cam surface 22 which acts onto and engages corresponding second actuating or cam surfaces 23 of the clamping members 9. In order to ensure simple actuation, the actuating surfaces 22, 23 have inclined, cam-like lines and areas of contact with each other.

By compressing the springs 18 and by moving the clamping members together, the guide rod 4 is freed and out of engagement with the inner clamping surfaces of the clamping openings 9a. However, it is easily conceivable to shape the inner surfaces of the openings 9a in such a way that the function is reversed, i.e. that the guide rod 4 is free from engagement with the openings 9a when the clamping members are apart from each other, while they clamp under the force of the piston element 20 when moved towards the free ends of the clamping members 9. In any case, the arrangement of the guide surfaces 12, 13 and 14, and the pin 15 will ensure that the inner surfaces of the clamping openings 9a engage the guide rod simultaneously and, thus, combine their efforts. Any longitudinal displacement or unsymmetrical movement of the clamping members 9, which could lead to individual engagement of one clamping member 9 and then of the other in a succession is avoided, thus avoiding jumping of the linear movement unit 1 beyond a desired position.

In the embodiment shown, the piston element 20 can be displaced by means of a fluid, particularly pneumatically by pressurized air. To this end, a disk-like portion of the piston element 20 supports a sealing ring 24 or any other sealing arrangement, and the actuating cylinder 19 has a fluid supply connection 25. optionally, the fluid supply connection 25 is in (or on) a cylinder cover (substantially formed by the flat top wall shown in FIG. 1) that is separable from the actuating cylinder 19 so that the piston element 20 can be inserted and/or oriented in the sleeve 8 when such cover is open. Orientation or any orienting aid has to be chosen in such a way that finally the actuating surfaces 22, 23 engage each other in the desired manner. Optionally, however, the actuating surfaces 22, 23 are shaped in such a way that the piston element 20 will orient itself forcibly and automatically. Return motion of the piston element 20 may either be achieved passively by movement of the clamping members 9 due to the pressure exerted by the spring elements 18 indirectly acting onto the inclined surfaces 22, 23, or actively by changing the fluid pressure within the cylinder 19.

Since it is useful to be able to detect the respective position of the piston element 20, an indicating arrangement, particularly a ring 26, e.g. of magnetic material, is provided around the piston element 20, the position of which can be detected. Alternatively the cylinder 19 is of transparent material to make the ring 26 visible. The ring 26 is held between the sealing 24 and an elastic holding ring 27 inserted into a groove. It will be understood that other actuating means known per se could be used, such as mechanical, electromechanical or hydraulical means, to press the clamping members 9 together in a controlled manner. It may be also convenient if the (for example wedge-like) actuating device moves the clamping members 9 apart into their first position, while movement into the second position is provided by a return device, e.g. a return spring, or by an active actuating device.

Figure 2:
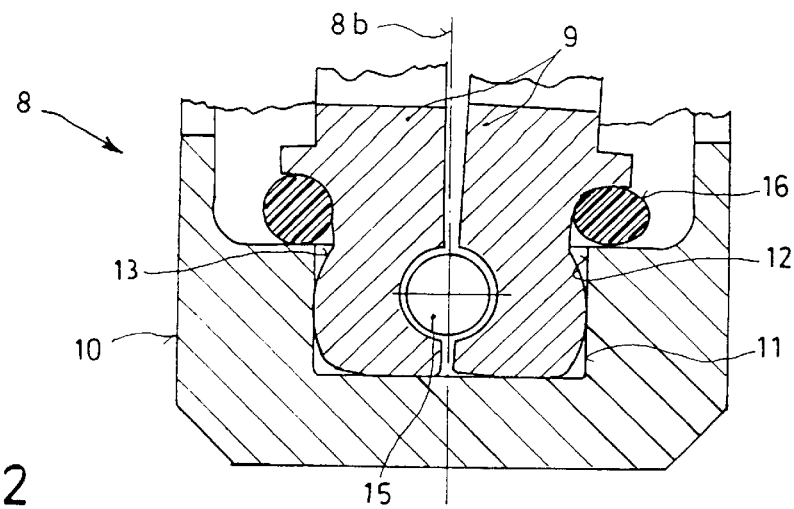
FIG. 2 shows a pivotal guidance comprising clamping members with a spherical foot portion.

FIG. 2 shows the foot or closure region 10 of the sleeve 8 having the guide recess 11 and receiving the foot or guide ends of the clamping members 9. In this embodiment, the second guide surface 12 forms a cylindrical surface around the axis 8b of the sleeve 8. The guide surface 13 of each clamping member 9 is calotte-shaped (part of a sphere). After insertion of the clamping members 9 and the elastic ring 14 as well of the pin 15, the same are oriented in such a manner that the guide rod 4 can be pushed through the clamping openings 9a.

Figure 3:
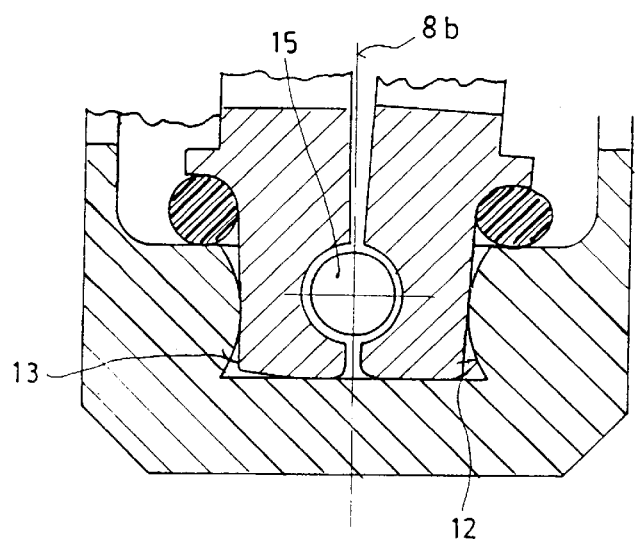
FIG. 3 is a pivotal guidance comprising a guiding surface of a holder which is curved when seen in a section transverse to the pivot axis.

FIG. 3 shows an embodiment in which the second guide surface 12 is curved in a plane transverse to the pivoting axis of pin 15. Preferably, however, the second guide surface 12 forms a part of a cylinder, the axis of which is parallel to the pivoting axis. The foot or guide ends of the clamping members 9 may correspondingly have a square or rectangular cross-section, and, preferably, flat first guide surfaces 13 so that they can only be inserted into the guide recess 11 if they and the clamping openings 9a are appropriately oriented. Optionally, however, the first and second guide surfaces 12, 13 are formed rotation symmetrically with respect to the axis 8*b* of the sleeve 8.

Figure 4:
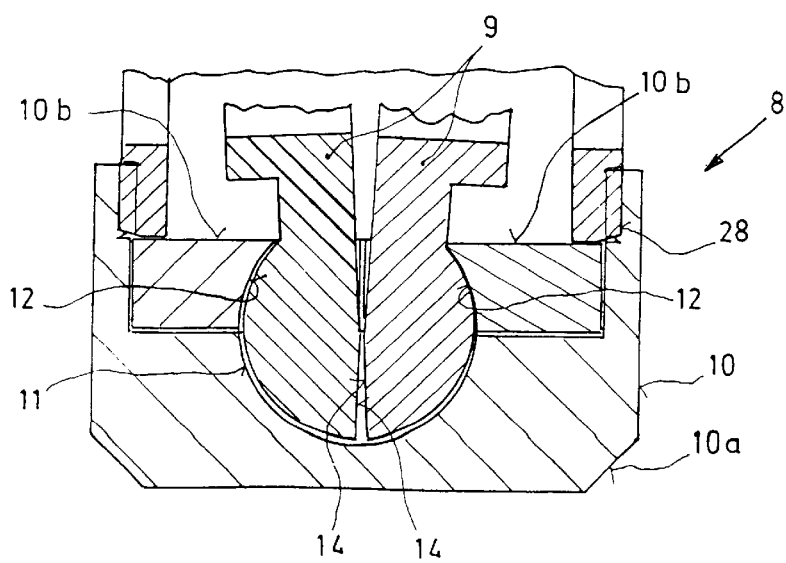
FIG. 4 depicts a pivotal guidance of a ball pivot type.

FIG. 4 shows a holding arrangement of the clamping members 9 which is in the form of a ball joint. The foot or closure region 10 of the sleeve 8 and its guide recess 11 is separable from the outer wall of the cylinder, but can be connected to it via a threaded arrangement 28, thus forming a screw cap. In order to insert the foot or guide ends of the clamping members 9, that have calotte-shaped (portion of a sphere) first guide surfaces 13, into the recess 11, the closure region 10 is formed by three parts. A closure part 10*a* comprises the inner thread of the threaded arrangement 28 on its top, as well as a substantially semi-spherical inner surface at its bottom to form the recess 11. The foot or guide ends of the clamping members 9 are each inserted into a semi-circular disk-like guiding part 10*b* received in a cylindrical bore of the closure part 10*a*. The second guide surface 12 is now formed by the calotte-shaped of the semicircular guide parts 10*b* (shown at each side of the clamping members 9 in FIG. 4) in conjunction with the closure part 10*a*. This pivot bearing has, thus, also the function of holding the foot portions of the clamping members 9 together so that the pin 15 and the elastic ring 16 can be omitted.

The third guide surfaces 14, instead of being curved, consist preferably each of a flat partial surface formed in such a way that the clamping members 9 engage each other in the region of the pivoting axis only. It will be understood by those skilled in the art that in the embodiment of FIG. 4, instead of a ball joint-like guidance, also a cylindrical guidance may be provided in which case the first and second guide surfaces 12, 13 form part of a cylinder, the axis of which substantially coincides with the pivoting axis of the clamping members 9.

What is claimed is:

1. A locking device for a linear movement unit supported displaceably along at least one guide rod, said locking device comprising:
   a pair of clamping members comprising each a clamping opening for receiving said guide rod, each of said clamping members having a foot end and a head end and being pivotal between a first position in which they frictionally engage said guide rod to lock said unit against any movement along said guide rod, and a second position wherein said unit is freely displaceable along said guide rod;
   actuation means acting onto said head end of each of said clamping members for pivoting said clamping members about corresponding pivot axes from said first position into said second position and vice-versa, wherein said pivot axes are located at a distance to said foot ends between said head and said foot ends;
   guide means for guiding said pivoting movement of said clamping members, said guide means including:
   holding means for said clamping members; and
   at least first guide surfaces formed on said clamping members and second cooperating guide surfaces formed on said holding means, wherein at least one of each pair of said cooperating guide surfaces are curved in cross-section so as to guide said pivoting movement of said clamping members substantially free from play.

2. Locking device as claimed in claim 1, wherein at least one of said guide surfaces is formed on said holding means.

3. Locking device as claimed in claim 1, wherein said guide means are within the region of said foot ends.

4. Locking device as claimed in claim 1, wherein at least one of said guide surfaces is in the form of a portion of a circle when seen in a sectional plane transverse to said pivot axis.

5. Locking device as claimed in claim 1, wherein at least one of said guide surfaces is calotte-shaped.

6. Locking device as claimed in claim 5, wherein two of said guide surfaces are engaging with and are assigned to each other, said two guide surfaces being calotte-shaped corresponding to one another.

7. Locking device as claimed in claim 1, wherein at least one of said guide surfaces is at least partially cylindrical, the axis of the cylinder extending in the direction of said pivot axis.

8. Locking device as claimed in claim 7, wherein two of said guide surfaces are engaging with and are assigned to each other, said two guide surfaces being at least partially cylindrical corresponding to one another.

9. Locking device as claimed in claim 1, further comprising at least a third guide surface.

10. Locking device as claimed in claim 9, further comprising a fourth guide surface cooperating with said third guide surface.

11. Locking device as claimed in claim 10, further comprising a guide element within a sleeve, said fourth guide surface being formed on said guide element engaging said third surface formed on at least one clamping member.

12. Locking device as claimed in claim 9, wherein said guide surfaces of each of said clamping means comprises at least a third guide surface, said third guide surfaces of respective ones of said clamping means engaging each other at least when pivoting.

13. Locking device as claimed in claim 1, wherein said pivot axes of said pair of clamping members are urged into coincidence by said guide means.

14. A locking device for a linear movement unit supported displaceably along at least one guide rod, said locking device comprising:
   a pair of clamping members comprising each a clamping opening for receiving said guide rod, said clamping members having a foot end and a head end and being pivotal between a first position in which they frictionally engage said guide rod to lock said unit against any movement along said guide rod, and a second position wherein said unit is freely displaceable along said guide rod;
   actuation means acting onto said head end of said clamping members for pivoting said clamping members about a pivot axis from said first position into said second position and vice-versa;
   guide means for guiding said pivoting movement of said clamping members, said guide means including:
   holding means for said clamping members;
   at least first and second cooperating guide surfaces on at least one of said clamping members, at least one of said guide surfaces being curved in cross-section so as to guide said pivoting movement of said clamping members substantially free from play;
   further comprising at least a third guide surface;
   a fourth guide surface cooperating with said third guide surface;
   a guide element within a sleeve, said fourth guide surface being formed on said guide element engaging said third surface formed on at least one clamping member; and
   wherein said guide element comprises a pin intermediate between said foot ends of said clamping members to form an axle.

15. A locking device for a linear movement unit supported displaceably along at least one guide rod, said locking device comprising:

a pair of clamping members comprising each a clamping opening for receiving said guide rod, said clamping members having a foot end and a head end and being pivotal between a first position in which they frictionally engage said guide rod to lock said unit against any movement along said guide rod, and a second position wherein said unit is freely displaceable along said guide rod;

actuation means acting onto said head end of said clamping members for pivoting said clamping members about a pivot axis from said first position into said second position and vice-versa;

guide means for guiding said pivoting movement of said clamping members, said guide means including:

holding means for said clamping members;

at least first and second cooperating guide surfaces on at least one of said clamping members, at least one of said guide surfaces being curved in cross-section so as to guide said pivoting movement of said clamping members substantially free from play;

wherein said actuating means comprise urging means for urging said clamping members in one of said first and second positions, and positive actuating means for pivoting said clamping members in the opposite one of said first and second positions against said urging means.

16. Locking device as claimed in claim 15, wherein said urging means are arranged to urge said clamping means into their first position.

17. Locking device as claimed in claim 15, wherein said urging means comprise spring means.

18. A locking device for a linear movement unit supported displaceably along at least one guide rod, said locking device comprising:

a pair of clamping members comprising each a clamping opening for receiving said guide rod, said clamping members having a foot end and a head end and being pivotal between a first position in which they frictionally engage said guide rod to lock said unit against any movement along said guide rod, and a second position wherein said unit is freely displaceable along said guide rod;

actuation means acting onto said head end of said clamping members for pivoting said clamping members about a pivot axis from said first position into said second position and vice-versa;

guide means for guiding said pivoting movement of said clamping members, said guide means including:

holding means for said clamping members;

at least first and second cooperating guide surfaces on at least one of said clamping members, at least one of said guide surfaces being curved in cross-section so as to guide said pivoting movement of said clamping members substantially free from play;

wherein said actuating means comprise piston and cylinder means, and at least one actuating projection on said piston means acting on said head end of at least one of said clamping means when moved towards said head end and away from it.

19. A locking device for a linear movement unit supported displaceably along at least one guide rod, said locking device comprising:

a pair of clamping members comprising each a clamping opening for receiving said guide rod, said clamping members having a foot end and a head end and being pivotal between a first position in which they frictionally engage said guide rod to lock said unit against any movement along said guide rod, and a second position wherein said unit is freely displaceable along said guide rod;

actuation means acting onto said head end of said clamping members for pivoting said clamping members about a pivot axis from said first position into said second position and vice-versa;

guide means for guiding said pivoting movement of said clamping members, said guide means including:

holding means for said clamping members;

at least first and second cooperating guide surfaces on at least one of said clamping members, at least one of said guide surfaces being curved in cross-section so as to guide said pivoting movement of said clamping members substantially free from play; and elastic means surrounding said clamping means to hold them together as a unit.

20. Locking device as claimed in claim 19, wherein said elastic means are arranged in the region of said foot ends of said clamping members.

21. Locking device as claimed in claim 19, wherein said elastic means comprise a ring of elastic material.

* * * * *